United States Patent
Horng et al.

(10) Patent No.: US 9,876,447 B2
(45) Date of Patent: Jan. 23, 2018

(54) MOTOR SYSTEM AND FAN MODULE USING THE SAME

(71) Applicant: SUNON ELECTRONICS(FOSHAN) CO., LTD., Foshan (CN)

(72) Inventors: Alex Horng, Kaohsiung (TW); Hung-Chin Mai, Kaohsiung (JP); Chien-Cheng Wang, Kaohsiung (TW)

(73) Assignee: Sunon Electronics (Foshan) Co., Ltd., Foshan (CN)

( * ) Notice: Subject to any disclaimer, the term of this patent is extended or adjusted under 35 U.S.C. 154(b) by 0 days.

(21) Appl. No.: 15/175,699

(22) Filed: Jun. 7, 2016

(65) Prior Publication Data

US 2016/0380559 A1 Dec. 29, 2016

(30) Foreign Application Priority Data

Jun. 26, 2015 (CN) .......................... 2015 1 0366370

(51) Int. Cl.
*H02P 6/14* (2016.01)
*H02P 3/22* (2006.01)
*F04D 27/00* (2006.01)

(52) U.S. Cl.
CPC .............. *H02P 3/22* (2013.01); *F04D 27/008* (2013.01)

(58) Field of Classification Search
CPC ........ H02P 6/085; H02P 7/0044; H02P 6/008; H02P 6/14; H02P 7/28; H02P 6/06
USPC ..................... 318/400.26, 400.29, 370, 400.3
See application file for complete search history.

(56) References Cited

U.S. PATENT DOCUMENTS

| 5,541,487 | A  | * | 7/1996  | Yorozu ..................... H02P 8/36 318/400.13 |
| 6,995,531 | B2 | * | 2/2006  | Ichimaru ............. H02M 7/5388 318/400.29 |
| 7,942,627 | B2 | * | 5/2011  | Jin ........................ F04D 19/007 415/199.4 |
| 8,018,186 | B2 | * | 9/2011  | Frankel ..................... H02P 3/22 318/400.26 |
| 8,035,967 | B2 | * | 10/2011 | Oh ...................... F04D 25/0613 361/694 |
| 8,716,961 | B2 | * | 5/2014  | Ramu ...................... H02K 1/24 318/139 |
| 2009/0263238 | A1 | * | 10/2009 | Jarrah ..................... F04D 29/44 415/199.5 |

(Continued)

*Primary Examiner* — Rina Duda
(74) *Attorney, Agent, or Firm* — Muncy, Geissler, Olds & Lowe, P.C.

(57) ABSTRACT

A motor system includes a stator magnetic pole, a driving unit and a stop control unit. The stator magnetic pole is adapted to couple with a rotor for the rotor to rotate relative to the stator magnetic pole. The stator magnetic pole has first and second ends. The driving unit is electrically connected with the stator magnetic pole and drives the rotor to rotate by changing the polarity of the stator magnetic pole. The stop control unit is electrically connected to the stator magnetic pole and the driving unit. If the rotor rotates when the motor system is not electrically powered, the stator magnetic pole generates electricity that changes the path of the electric current flowing through the stop control unit, and the stator magnetic pole outputs an electric current from the first end to the second end or from the second end to the first end thereof. In addition, a fan module is also disclosed to solve the problem.

36 Claims, 12 Drawing Sheets

(56) References Cited

U.S. PATENT DOCUMENTS

2011/0097195 A1* 4/2011 Horng ................... F04D 27/004
                                                    415/121.2
2013/0271045 A1* 10/2013 Cheng .................... H02P 6/085
                                                    318/376

* cited by examiner

MOTOR SYSTEM AND FAN MODULE USING THE SAME

CROSS REFERENCE TO RELATED APPLICATIONS

The application claims the benefit of China application serial No. 201510366370.1, filed on Jun. 26, 2015, the subject matter of which is incorporated herein by reference.

BACKGROUND OF THE INVENTION

1. Field of the Invention

The present invention generally relates to a motor system and a fan module using the motor system and, more particularly, to a motor system with a quick stop function as well as a fan module using the motor system.

2. Description of the Related Art

Motors have been widely used in electronic apparatuses (such as robotic arms or fans) that are designed to generate kinetic energy due to the ability to convert the electricity energy into the kinetic energy. As an example, when a fan is installed in an electronic device (such as a consumer electronic product or a portable electronic product), the heat in the electronic device can be dispelled by the fan. Thus, the overheating of the electronic device can be prevented.

However, when the power source of the fan is shut off (for repairing purpose, for example), the fan will still rotate for a short period of time (about 15 to 20 seconds) due to inertia. During the period of time, one may accidentally touch the blades of the fan and become injured.

In light of this, it is necessary to provide a novel fan module and a novel motor system with a quick stop function.

SUMMARY OF THE INVENTION

It is therefore the objective of this invention to provide a motor system which can be stopped quickly when the power source is shut off.

It is another objective of this invention to provide a fan module which can be stopped quickly when the power source is shut off.

In an embodiment, a motor system including a stator magnetic pole, a rotor, a driving unit and a stop control unit is disclosed. The stator magnetic pole has first and second ends. The rotor is rotatably coupled with the stator magnetic pole. The driving unit is electrically connected with the stator magnetic pole and drives the rotor to rotate by changing the polarity of the stator magnetic pole. The stop control unit is electrically connected to the stator magnetic pole and the driving unit. If the rotor rotates when the motor system is not electrically powered, the stator magnetic pole generates electricity that changes a path of an electric current flowing through the stop control unit, and the stator magnetic pole outputs an electric current from the first end to the second end or from the second end to the first end thereof, thereby stopping the motor system.

In another embodiment, a fan module including a stator magnetic pole, a rotor, a driving unit and a stop control unit is disclosed. The stator magnetic pole has first and second ends. The rotor is rotatably coupled with the stator magnetic pole. A blade unit is coupled with the rotor. The driving unit is electrically connected with the stator magnetic pole and drives the blade unit to rotate by changing the polarity of the stator magnetic pole. The stop control unit is electrically connected to the stator magnetic pole and the driving unit. If the rotor rotates when the fan module is not electrically powered, the stator magnetic pole generates electricity that changes a path of an electric current flowing through the stop control unit, and the stator magnetic pole outputs an electric current from the first end to the second end or from the second end to the first end thereof, thereby stopping the fan module.

In a form shown, the stop control unit includes a first switch, a second switch and a third switch. The first switch and the second switch are electrically connected to the stator magnetic pole and the driving unit. The third switch is electrically connected to the first switch and the second switch. If the motor system is not electrically powered, the third switch is turned off and the electricity generated by the stator magnetic pole turns on the first and second switches, thereby stopping the motor system.

In the form shown, an one-way element may be connected between the third switch and the first end of the stator magnetic pole, and another one-way element may be connected between the third switch and the second end of the stator magnetic pole.

In the form shown, each of the one-way elements may be a diode.

In the form shown, each of the first, second and third switches may be an N-channel MOSFET.

In the form shown, each of the first, second and third switches may include a first end, a second end and a third end. The first ends of the first and second switches may be electrically connected to the second end of the third switch. The second ends of the first and second switches may be electrically connected to the stator magnetic pole and the driving unit. The first end of the third switch is electrically connected to a power supply unit, and the third ends of the first, second and third switches may be electrically connected to the ground.

In the form shown, a resisting element and an one-way element may be arranged between the third ends of the first and second switches.

In the form shown, the one-way element may be a diode.

In the form shown, the stop control unit may include a first one-way element, a second one-way element, a resisting element, an electronic switch, a third one-way element and a fourth one-way element. The stator magnetic pole is connected between the first and second one-way elements in series. The resisting element is electrically connected to the first and second one-way elements. The electronic switch is electrically connected to the resisting element. The third and fourth one-way elements are electrically connected between the resisting element and the driving unit.

In the form shown, the electronic switch may be an N-channel MOSFET.

In the form shown, each of the first, second, third and fourth one-way elements may be a diode.

In the form shown, the stator magnetic pole may include at least one coil.

In the form shown, the driving unit may include a bridge circuit.

In the form shown, the bridge circuit includes two upper arm elements and two lower arm elements. Each of the two upper arm elements is electrically connected to an auxiliary switch. The two upper arm elements may be electrically connected to a power supply unit and the stator magnetic pole, and the two lower arm elements may be electrically connected to the stator magnetic pole and a controller.

In the form shown, the controller may be electrically connected to the two auxiliary switches.

In the form shown, the controller may be electrically connected to a magnetic inducing element.

In the form shown, the stator magnetic pole may be mounted to a fan frame.

In the form shown, the driving unit and the stop control unit may be integrated on a circuit board. The circuit board may be mounted to a fan frame. The circuit board may be integrally formed with or detachably mounted to the fan frame. The circuit board may form a bottom plate of the fan frame.

In the above motor system and the fan module, the rotor may be rotatably coupled with the stator magnetic pole, and the driving unit may be electrically connected with the stator magnetic pole to control the stator magnetic pole to change its polarity. Moreover, the stop control unit is electrically connected to the stator magnetic pole and the driving unit. If the rotor rotates under the inertia effect when the power source of the motor system or the fan module is shut off, or if the rotor is driven to rotate by an external force, the stop control unit is able to control the stator magnetic pole to generate a magnetic force during the rotation of the rotor without using any energy-storing component (such as a capacitor). The magnetic force is able to brake the rotor, thus quickly stopping the rotor of the motor system or the fan module. This will advantageously protect the operator from damage, improves the control accuracy, prevents the operational failure of the motor system or the fan module resulting from aging of the energy-storing component, prevents the loss of the intake air as the failed fan expels air out of the system when driven by the air to rotate in an opposite direction, and provides an efficient control of the system. Accordingly, the motor system and the fan module can be used in a robotic arm or a fan system having a plurality of parallel-connected fans.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
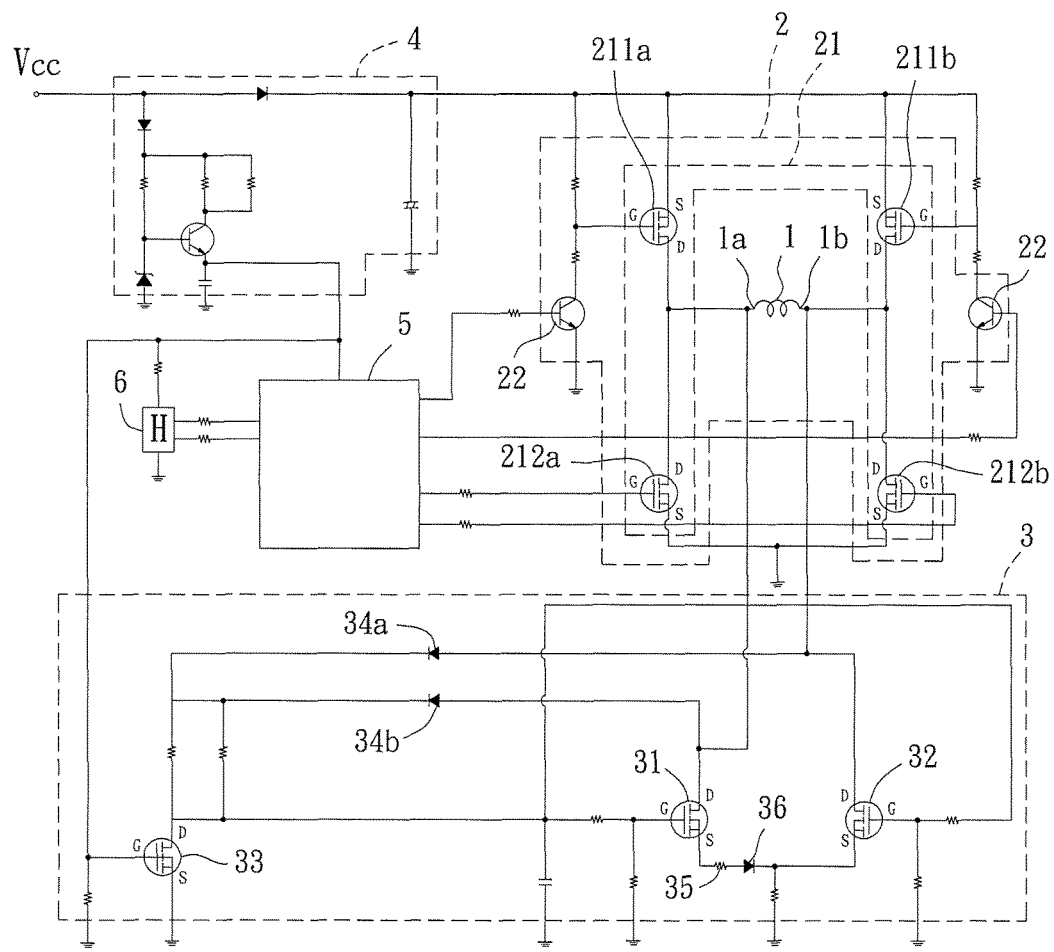
FIG. 1 shows a circuit diagram of a motor system according to a first embodiment of the invention.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows a circuit diagram of a motor system according to a first embodiment of the invention. The motor system includes a stator magnetic pole 1, a driving unit 2 and a stop control unit 3. A rotor (not shown) may be rotatably coupled with the stator magnetic pole 1. The operational mechanism between the rotor and the stator magnetic pole 1 is not described herein as it can be readily appreciated by the skilled persons. The driving unit 2 is electrically connected with the stator magnetic pole 1 and controls the stator magnetic pole 1 to change the polarity in order to drive the rotor to rotate under electricity. The principle of the driving unit 2 controlling the polarity change of the stator magnetic pole 1 is not described herein as it can be readily appreciated by the skilled persons. The stop control unit 3 is electrically connected to the stator magnetic pole 1 and the driving unit 2. When the power source of the motor system is shut off, the rotor can still be driven in another manner, such as under the inertial force of the rotation of the rotor or under the wind power. In such an mechanism, the stator magnetic pole 1 is able to generate electricity that changes the path of the electric current flowing through the stop control unit 3, such that an electric current may be generated and may flow from a first end (such as the end 1a) to a second end (such as the end 1b) of the stator magnetic pole 1 or from the second end to the first end, thereby stopping the rotation of the motor system.

In the embodiment, the stop control unit 3 may include a first switch 31, a second switch 32 and a third switch 33. The first switch 31 and the second switch 32 are electrically connected to the stator magnetic pole 1 and the driving unit 2. The third switch 33 is electrically connected to the first switch 31 and the second switch 32. When the power source of the motor system is shut off, the third switch 33 is turned off and the stator magnetic pole 1 will generate electricity (such as back-EMF) that turns on the first switch 31 and the second switch 32. As such, the motor system is stopped. Furthermore, an one-way element 34a is connected between the third switch 33 and a second end (1b) of the stator magnetic pole 1, and another one-way element 34b is connected between the third switch 33 and a first end (1a) of the stator magnetic pole 1. The one-way elements 34a, 34b are used to prevent the electric current from flowing back to the stator magnetic pole 1 from the third switch 33.

Referring to FIG. 1 again, the stator magnetic pole 1 may include at least one coil, and the driving unit 2 may include a bridge circuit 21. The bridge circuit 21 may include a half bridge circuit or a full bridge circuit. In the embodiment, the bridge circuit 21 includes a full bridge circuit and a coil. The bridge circuit 21 may include two upper arm elements 211a, 211b (such as P-channel MOSFETs) and two lower arm elements 212a, 212b (such as N-channel MOSFETs). Each upper arm element 211a, 211b may be connected to an auxiliary switch 22 (such as a npn transistor). The upper arm elements 211a, 211b may be electrically connected to a power supply unit 4 (such as a voltage regulator) and the stator magnetic pole 1. The lower arm elements 212a, 212b may be electrically connected to the stator magnetic pole 1, the ground and a controller 5 (such as a PWM generator or a micro controller). The controller 5 may be electrically connected to the auxiliary switches 22 to control the upper arm elements 211a, 211b. The controller 5 may also be connected to a magnetic inducing element 6 (such as a Hall element) to assist the controller 5 in controlling the operations of the motor system (such as the rotation speed).

Referring to FIG. 1 again, each of the first, second and third switches 31, 32 and 33 may be an N-channel Metal-Oxide-Semiconductor Field-Effect Transistor (N-channel MOSFET). In this regard, each of the first, second and third switches 31, 32 and 33 includes a first end "G" (such as gate), a second end "D" (such as drain) and a third end "S" (such as source), In this regard, the first ends "G" of the first and second switches 31 and 32 are electrically connected to the second end "D" of the third switch 33. The second ends "D" of the first and second switches 31 and 32 are electrically connected to the first and second end 1a and 1b of the stator magnetic pole 1, and are electrically connected to the driving unit 2. The first end "G" of the third switch 33 is electrically connected to a power supply unit 4, and the third ends "S" of the first, second and third switches 31, 32 and 33 are electrically connected to the ground. A resisting element 35 (such as a resistor) and an one-way element 36 may be arranged between the third ends "S" of the first and second switches 31 and 32. Since the resisting element 35 has a resistance "R," the resistance "R" and the inductance "L" of the stator magnetic pole 1 can be used to calculate a time constant τ (τ=L/R). The time constant τ is related to the electricity-discharging speed of the motor system when the rotor of the motor system rotates under the inertia effect. Based on this, the resistance "R" of the resisting element 35 can be changed to fine adjust the period of time that is required to stop the motor system. For example, it will take a longer period of time to stop the motor system when the resistance "R" of the resisting element 35 is increased.

Referring to FIG. 1 again, when the motor system in the first embodiment of the invention is to be driven by electricity, the power supply unit 4 may be connected to a power source "Vcc." Thus, power can be supplied to the driving unit 2, the stop control unit 3, the controller 5 and the magnetic inducing element 6. Then, the controller 5 may generate and output four control signals (such as pulse signals) to the driving unit 2 in order to change the polarity of the stator magnetic pole 1. For example, the upper arm element 211a and the lower arm element 212b are turned on under the logic high signals of two of the four control signals while the upper arm element 211b and the lower arm element 212a are turned off under the logic low signals of the other two control signals. Then, the upper arm element 211b and the lower arm element 212a are turned on under the logic high signals of the other two control signals while the upper arm element 211a and the lower arm element 212b are turned off under the logic low signals of the two of the four control signals. In this manner, the direction of the electric current flowing through the stator magnetic pole 1 can be changed, thus changing the polarity of the stator magnetic pole 1. Accordingly, the rotor of the motor system can be operated, as elaborated below.

Figure 2A:
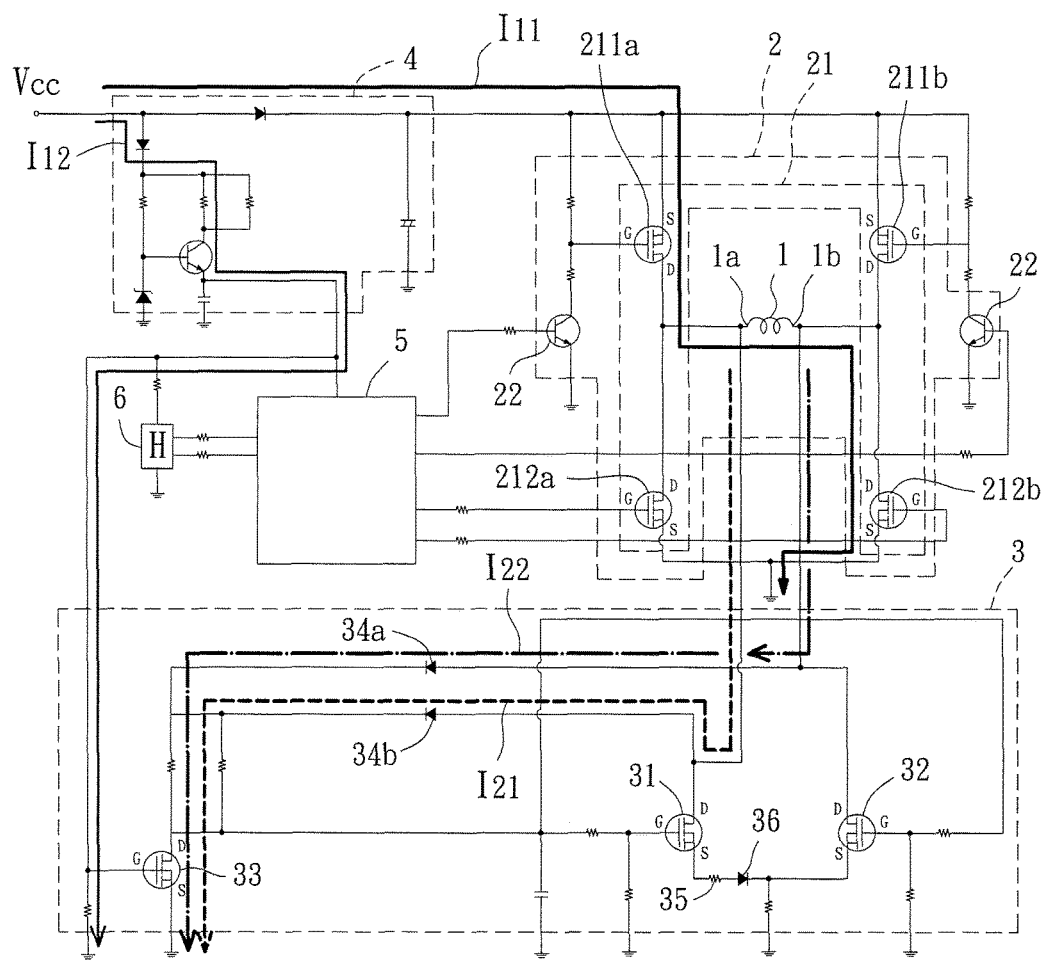
FIG. 2a shows a first operational diagram of the motor system of the first embodiment when the motor system is driven by a power source.

FIG. 2a shows a first operational diagram of the motor system of the first embodiment when the motor system is driven by a power source. When the upper arm element 211a and the lower arm element 212b are turned on and the upper arm element 211b and the lower arm element 212a are turned off, the power supply unit 4 may output an electric current I11 that flows through the upper arm element 211a, the first end 1a of the stator magnetic pole 1, the second end 1b of the stator magnetic pole 1, the lower arm element 212b and the ground. In addition, the power supply unit 4 also outputs an electric current I12 that flows to the third switch 33 of the stop control unit 3. In this regard, the third switch 33 is turned on and the first switch 31 and the second switch 32 are turned off. At this time, an electric current I21 is diverted from the electric current I11 at the first end 1a of the stator magnetic pole 1. The electric current I21 flows to the ground via the one-way element 34b and the third switch 33. Also, an electric current I22 is diverted from the electric current I11 at the second end 1b of the stator magnetic pole 1. The electric current I22 flows to the ground via the one-way element 34b and the third switch 33. The one-way elements 34a and 34b prevent the electric currents I21 and I22 from flowing back to the stator magnetic pole 1, thus protecting the stator magnetic pole 1 from damage.

Figure 2B:
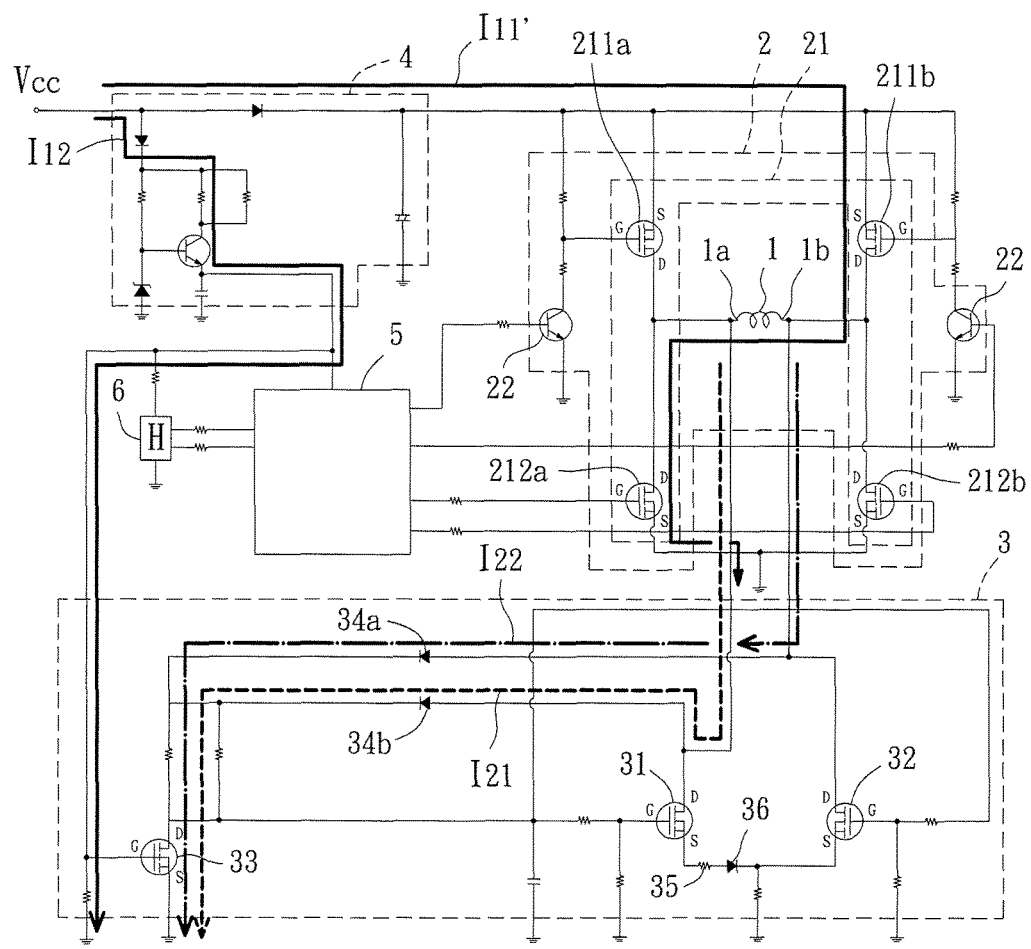
FIG. 2b shows a second operational diagram of the motor system of the first embodiment when the motor system is driven by the power source.

FIG. 2b shows a second operational diagram of the motor system of the first embodiment when the motor system is driven by the power source. When the upper arm element 211b and the lower arm element 212a are turned on and the upper arm element 211a and the lower arm element 212b are turned off, the power supply unit 4 may output an electric current I11' that flows through the upper arm element 211b, the second end 1b of the stator magnetic pole 1, the first end 1a of the stator magnetic pole 1, the lower arm element 212a and the ground. In addition, the power supply unit 4 also outputs an electric current I12 that flows to the third switch 33 of the stop control unit 3. In this regard, the third switch 33 is turned on and the first switch 31 and the second switch 32 are turned off. At this time, an electric current I21 is diverted from the electric current I11' at the first end 1a of the stator magnetic pole 1. The electric current I21 flows to the ground via the one-way element 34b and the third switch 33. Also, an electric current I22 is diverted from the electric current I11' at the second end 1b of the stator magnetic pole 1. The electric current I22 flows to the ground via the one-way element 34a and the third switch 33. Thus, the rotor of the motor system can stably operate by repeatedly generating the electric currents I11 and I11'.

In the meanwhile, when the power source of the motor system is shut off, the stator magnetic pole 1 will induce electricity if the rotor of the motor system keeps rotating due to inertia or due to the blowing force of the wind. Specifically, as the magnetic pole of the rotor magnet changes from N to S poles or from S to N poles, the stator magnetic pole 1 may output an electric current from the first end 1a or the second end 1b. Since the induced electricity of the stator magnetic pole 1 generates a magnetic force, the magnetic force will form a braking force for promptly stopping the motor system, as discussed below.

Figure 2C:
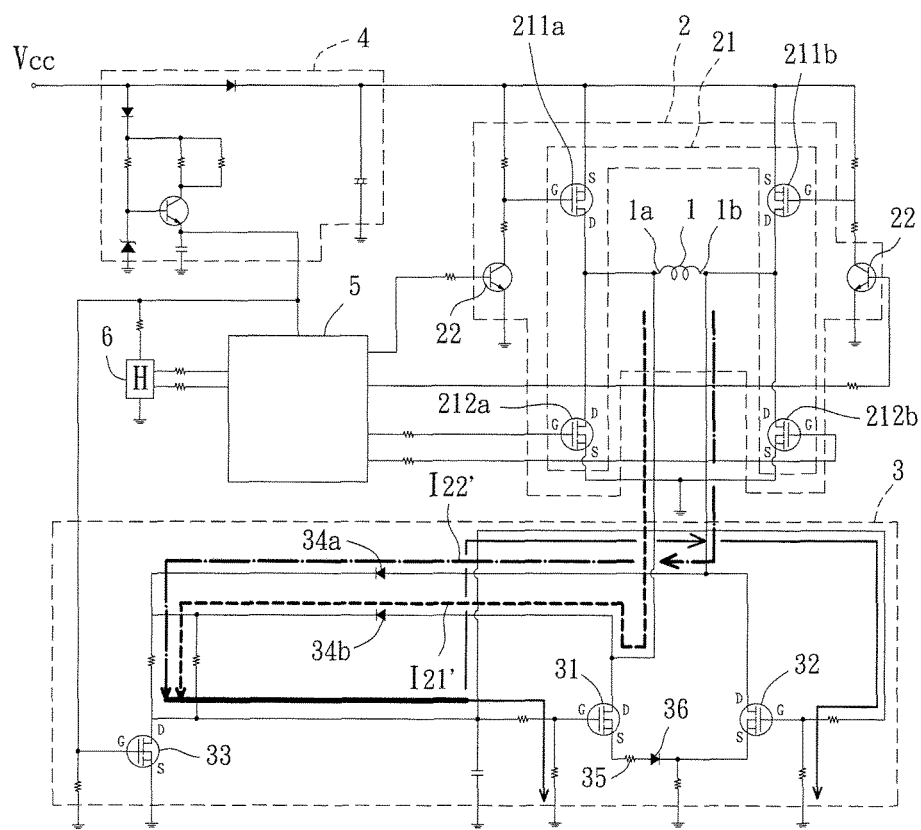
FIG. 2c shows a first operational diagram of the motor system of the first embodiment where the motor system is driven by an external force when the power source of the motor system is no longer available.

FIG. 2c shows a first operational diagram of the motor system of the first embodiment where the motor system is driven by an external force when the power source of the motor system is no longer available. When the power source of the motor system is shut off, the power supply unit 4 does not provide power to the driving unit 2, the stop control unit 3, the controller 5 and the magnetic inducing element 6.

Therefore, the upper arm elements 211a, 211b, the lower arm elements 212a, 212b and the third switch 33 are turned off. At this time, since the rotor of the motor system still rotates under the inertia effect, the stator magnetic pole 1 may generate complementary voltages (with different voltage levels) at the first and second ends 1a and 1b of the stator magnetic pole 1 as the rotor magnet repeatedly changes between the N and S poles (i.e. from N to S poles or from S to N poles) during the rotation thereof. As a result, the stator magnetic pole 1 may alternately generate an electric current at each of the first and second ends 1a and 1b thereof. Specifically, the electric current I21' generated at the first end 1a of the stator magnetic pole 1 may flow through the one-way element 34b, and the electric current I22' generated at the second end 1b of the stator magnetic pole 1 may flow through the other one-way element 34a. The electric current I21' and I22' then combines together and the combined electric current is further divided into two electric currents respectively flowing through the resistors of the gates of the first switch 31 and the second switch 32. Thus, the first switch 31 and the second switch 32 are turned on. It is therefore obtained that the first switch 31 and the second switch 32 can be turned on by the electricity generated by the stator magnetic pole 1. Then, an electric current will flow from the first end 1a to the second end 1b of the stator magnetic pole 1, or from the second end 1b to the first end 1a of the stator magnetic pole 1, for promptly stopping the motor system.

Figure 2D:
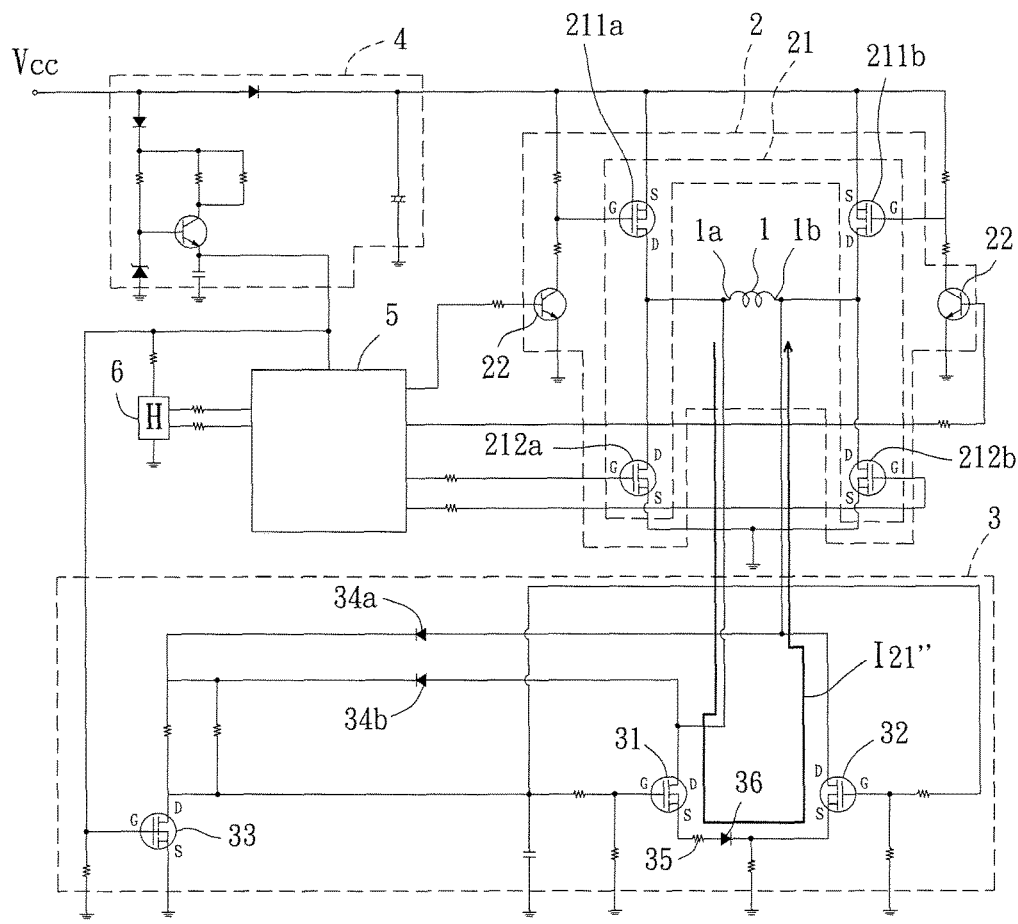
FIG. 2d shows a second operational diagram of the motor system of the first embodiment where the power source of the motor system is no longer available.

Based on this, each of the first and second ends 1a and 1b of the stator magnetic pole 1 may generate an electric current in an alternate manner in order to brake the rotor of the motor system. However, if an one-way element 36 is arranged between the first switch 31 and the second switch 32, the first and second ends 1a and 1b of the stator magnetic pole 1 will have different voltage levels. Besides, the electric current in the loop can flow in only one direction (as the direction indicated by electric current I21'' in FIG. 2d). Based on only the current I21'', an intermittently-generated braking force can smoothly stop the rotation of the motor system.

Figure 3:
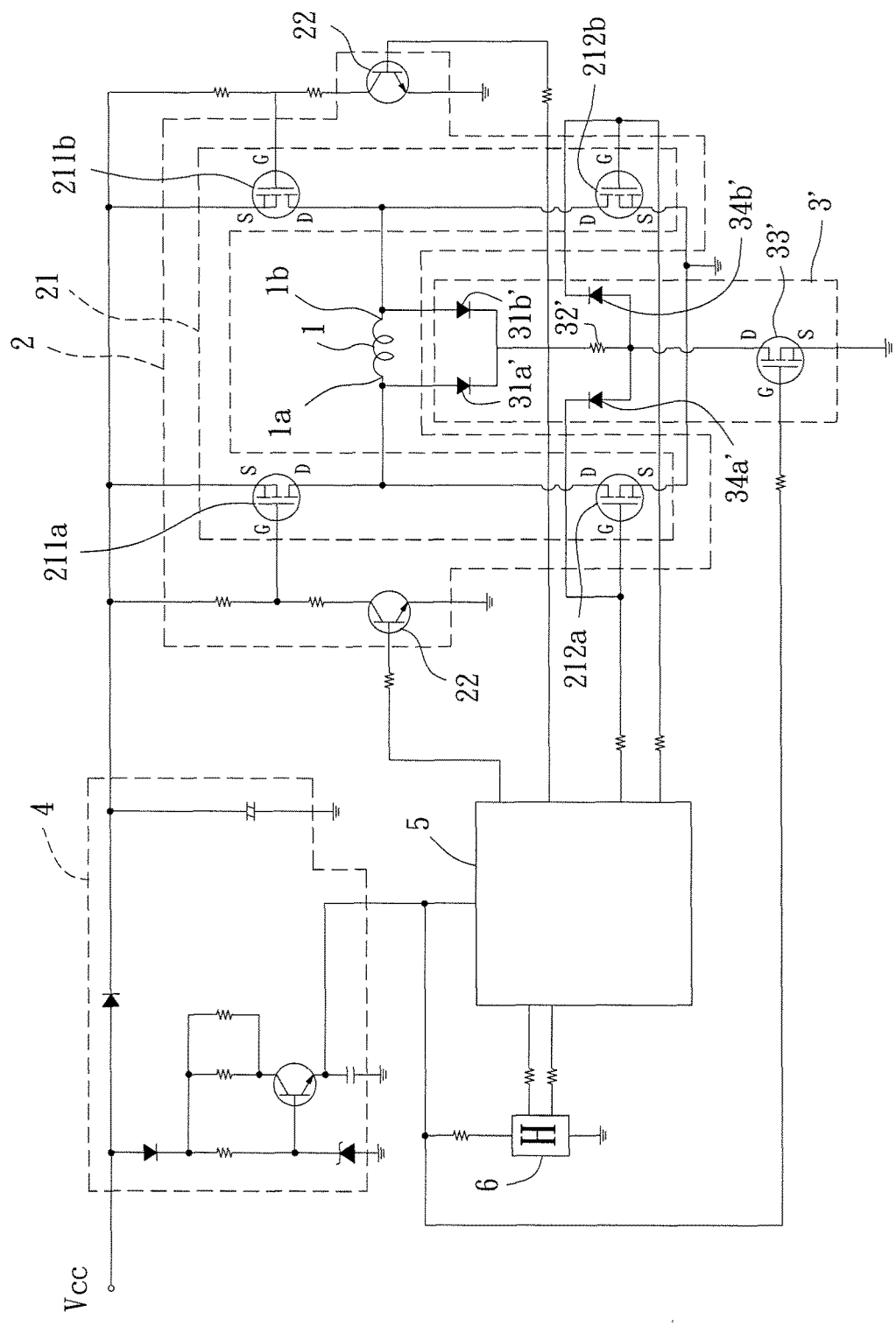
FIG. 3 shows a circuit diagram of a motor system according to a second embodiment of the invention.

FIG. 3 shows a circuit diagram of a motor system according to a second embodiment of the invention. The motor system includes the stator magnetic pole 1, the driving unit 2 and a stop control unit 3'. The stop control unit 3' is electrically connected to the stator magnetic pole 1 and the driving unit 2. If the rotor keeps rotating after the power source is shut off, the stator magnetic pole 1 is able to generate electricity that changes the path of the electric current flowing through the stop control unit 3'. As such, an electric current is generated at one end of the stator magnetic pole 1 (such as the first end 1a) and flows from the end to the other end of the stator magnetic pole 1 (such as the second end 1b), thus stopping the rotation of the motor system. Besides, the motor system in the second embodiment may include the power supply unit 4, the controller 5 and the magnetic inducing element 6. The details regarding the stator magnetic pole 1, the driving unit 2, the power supply unit 4, the controller 5 and the magnetic inducing element 6 may be referred to the first embodiment above.

In the embodiment, the stop control unit 3' may include a first one-way element 31a', a second one-way element 31b', a resisting element 32', an electronic switch 33', a third one-way element 34a' and a fourth one-way element 34b'. Each of the first, second, third and fourth one-way elements 31a', 31b', 34a' and 34b' may be a diode. The anodes of the first and second one-way elements 31a'' and 31b' may be respectively connected to two ends of the stator magnetic pole 1, so that the stop control unit 3' is able to receive the electricity generated by the stator magnetic pole 1 while the electric current of the stop control unit 3' is prevented from flowing to the stator magnetic pole 1. The resisting element 32' may be any type of the conventional resistor. The resisting element 32' includes one end that is connected to the cathodes of the first and second one-way elements 31a' and 31b'. In addition, the resisting element 32' has a resistance that may be multiple times larger than the real part resistance of the coil of the stator magnetic pole 1 (such as at least 10 times larger). As such, the majority of the electric current of the driving unit 2, as provided by the power supply unit 4, is able to flow to the stator magnetic pole 1. The electronic switch 33' may be an N-channel MOSFET. The electronic switch 33' may include an input end (such as the drain D) that is electrically connected to another end of the resisting element 32', an output end (such as the source S) that is connected to the ground, as well as a control end (such as the gate G) that is electrically connected to the power supply unit 4. The third and fourth one-way elements 34a' and 34b' are connected between the resisting element 32' and the driving unit 2. For example, the anodes of the third and fourth one-way elements 34a' and 34b' are electrically connected to the resisting element 32', and the cathodes of the third and fourth one-way elements 34a' and 34b' are electrically connected to the lower arm elements 212a, 212b, respectively. In this arrangement, the electric current from the stator magnetic pole 1 is able to flow to the lower arm elements 212a, 212b while any electric current is prevented from flowing from the lower arm elements 212a, 212b to the electronic switch 33'. Thus, damage to the electronic switch 33' can be prevented. Since the motor system in the second embodiment is powered in a manner similar to that in the first embodiment, it is not described herein for brevity. In the following, the operation of the motor system of the second embodiment is described.

Figure 4A:
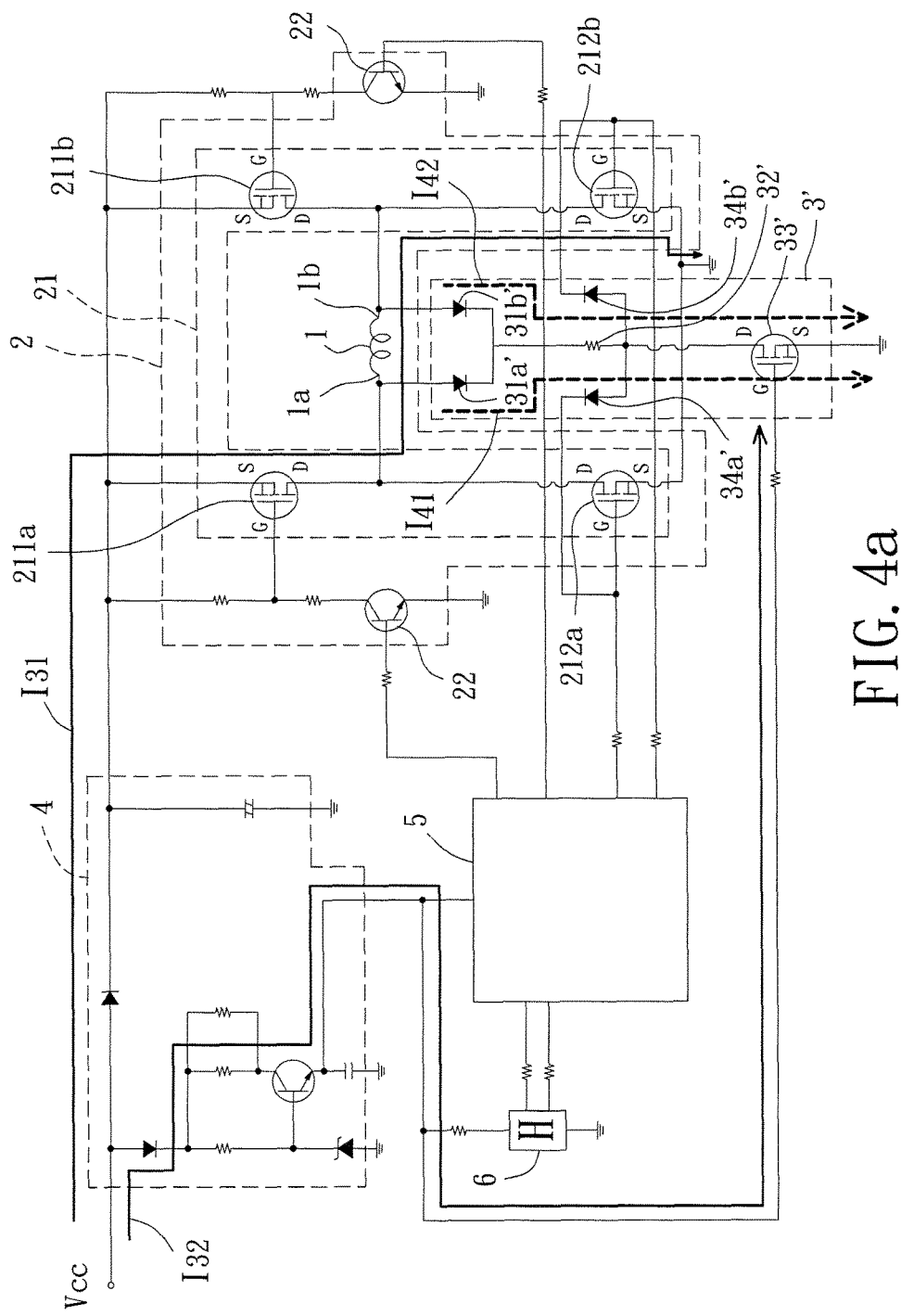
FIG. 4a shows a first operational diagram of the motor system of the second embodiment when the motor system is driven by a power source.

FIG. 4a shows a first operational diagram of the motor system of the second embodiment when the motor system is driven by a power source. When the upper arm element 211a and the lower arm element 212b are turned on and when the upper arm element 211b and the lower arm element 212a are turned off, the power supply unit 4 may output an electric current I31 that flows through the upper arm element 211a, the first end 1a of the stator magnetic pole 1, the second end 1b of the stator magnetic pole 1, the lower arm element 212b and the ground. In addition, the power supply unit 4 also outputs an electric current I32 that flows to the control end of the electronic switch 33' of the stop control unit 3'. In this regard, the electronic switch 33' is turned on. At this time, an electric current I41 is diverted from the electric current I31 at the first end 1a of the stator magnetic pole 1. The electric current I41 flows to the ground via the first one-way element 31a', the resisting element 32' and the electronic switch 33'. Also, an electric current I42 is diverted from the electric current I31 at the second end 1b of the stator magnetic pole 1. The electric current I42 flows to the ground via the second one-way element 31b', the resisting element 32' and the electronic switch 33'. The first and second one-way elements 31a' and 31b' prevent the electric currents I41 and I42 from flowing back to the stator magnetic pole 1, thus protecting the stator magnetic pole 1 from damage.

Figure 4B:
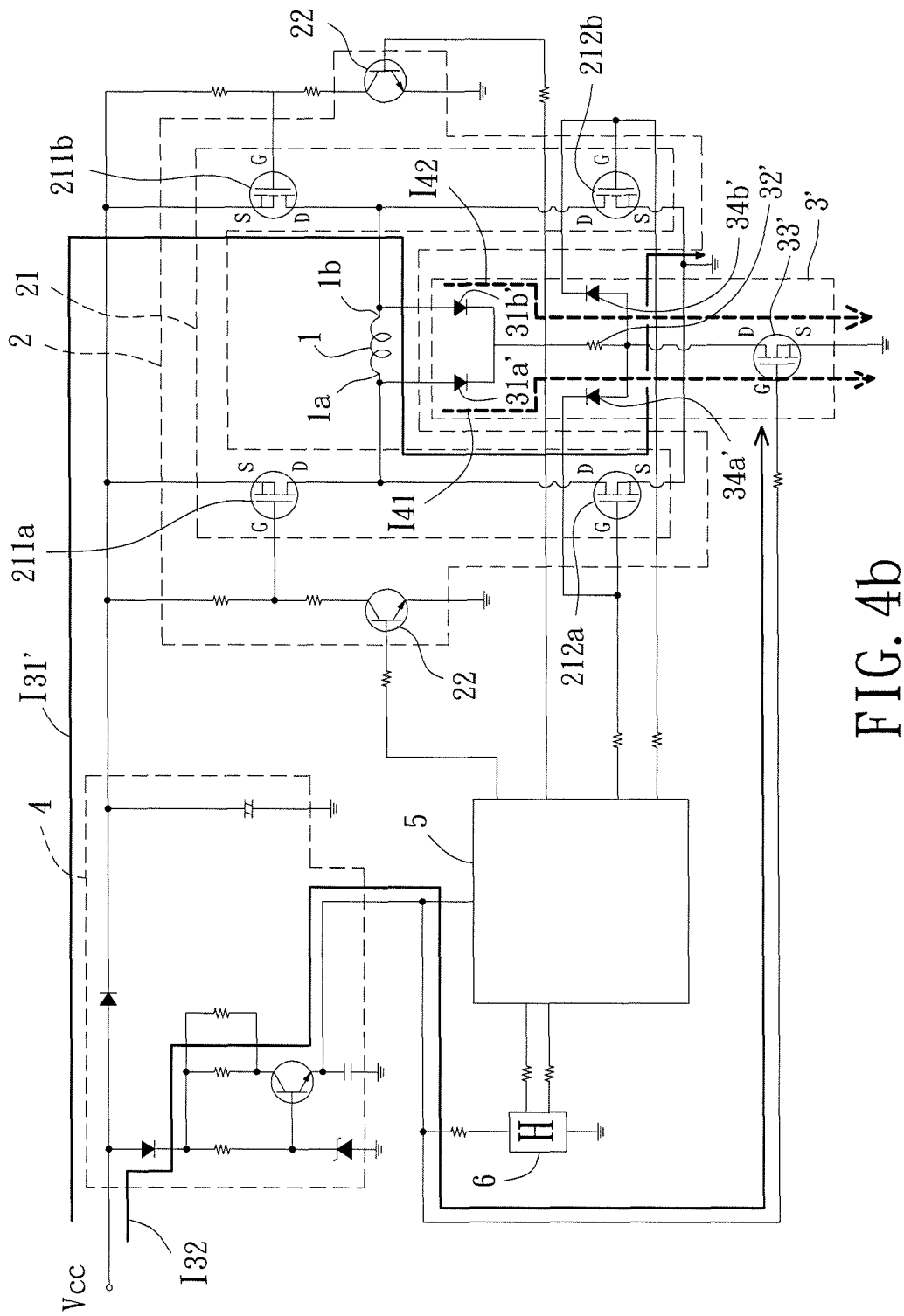
FIG. 4b shows a second operational diagram of the motor system of the second embodiment when the motor system is driven by the power source.

FIG. 4b shows a second operational diagram of the motor system of the second embodiment when the motor system is driven by the power source. When the upper arm element 211b and the lower arm element 212a are turned on and the upper arm element 211a and the lower arm element 212b are turned off, the power supply unit 4 may output an electric current I31' that flows through the upper arm element 211b, the second end 1b of the stator magnetic pole 1, the first end 1a of the stator magnetic pole 1, the lower arm element 212a and the ground. In addition, the power supply unit 4 also outputs an electric current I32 that flows to the electronic switch 33' of the stop control unit 3'. In this regard, the electronic switch 33' is turned on. At this time, an electric current I41 is diverted from the electric current I31' at the first end 1a of the stator magnetic pole 1. The electric current I41 flows to the ground via the first one-way element 31a', the resisting element 32' and the electronic switch 33'. Also, an electric current I42 is diverted from the electric current I31' at the second end 1b of the stator magnetic pole 1. The electric current I42 flows to the ground via the second one-way element 31b', the resisting element 32' and the electronic switch 33'. Thus, the rotor of the motor system can stably operate by repeatedly generating the electric currents I31 and I31'.

In the meanwhile, when the power source of the motor system is shut off, the stator magnetic pole 1 will induce electricity if the rotor of the motor system keeps rotating due to inertia or the blowing force of the wind. Specifically, as the magnetic pole of the rotor magnet changes from N to S poles or from S to N poles, the stator magnetic pole 1 may output an electric current from the first end 1a or the second end 1b. Since the induced electricity of the stator magnetic pole 1 generates a magnetic force, the magnetic force will form a braking force for promptly stopping the motor system, as discussed later.

Figure 4C:
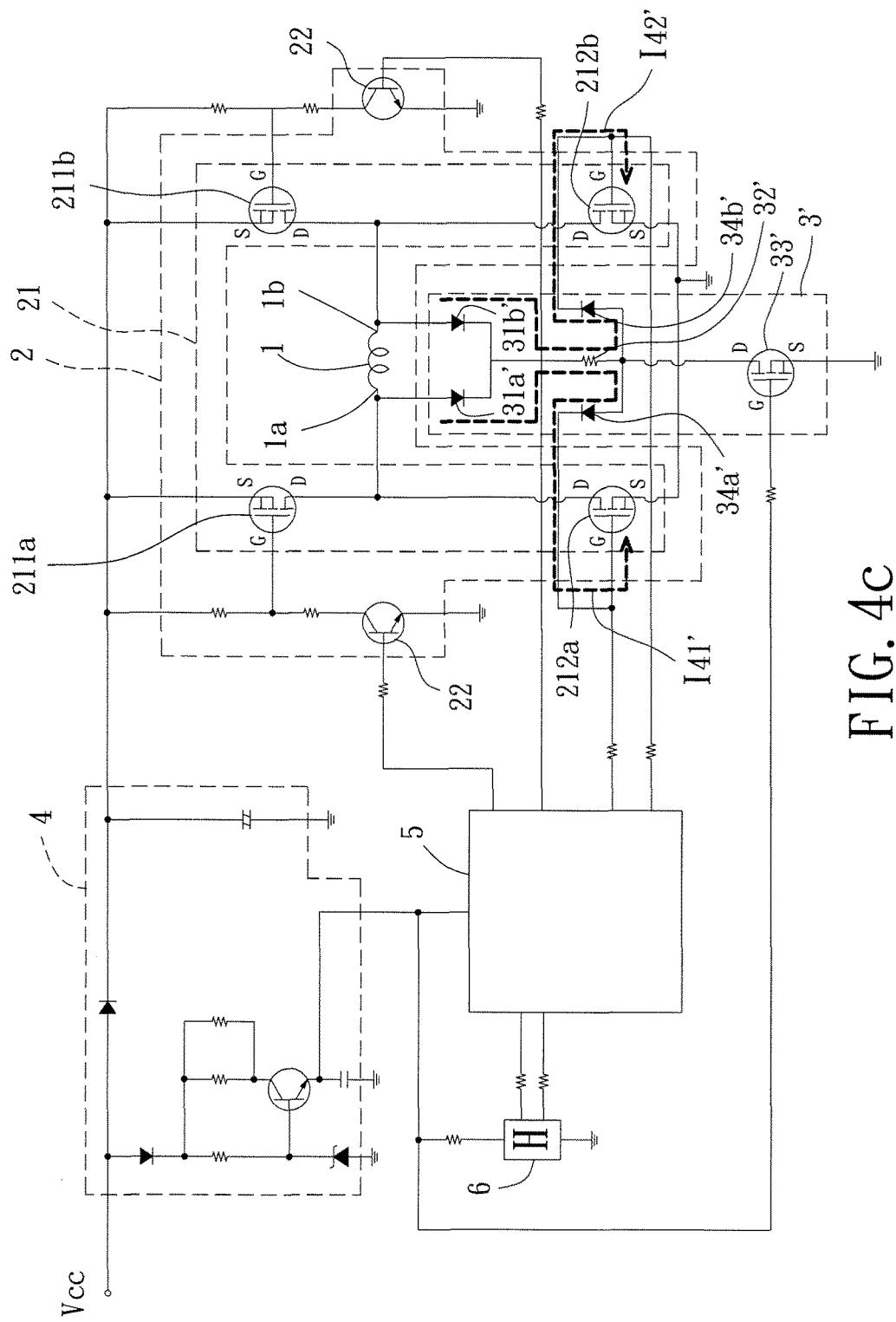
FIG. 4c shows a first operational diagram of the motor system of the second embodiment where the motor system is driven by an external force when the power source of the motor system is no longer available.

FIG. 4c shows a first operational diagram of the motor system of the second embodiment where the motor system is driven by an external force when the power source of the motor system is no longer available. When the power source of the motor system is shut off, the power supply unit 4 does not provide power to the driving unit 2, the stop control unit 3', the controller 5 and the magnetic inducing element 6. Therefore, the upper arm elements 211a and 211b and the electronic switch 33' are turned off. At this time, since the rotor of the motor system still rotates under the inertia effect, the stator magnetic pole 1 may generate complementary voltages (with different voltage levels) at the first and second ends 1a and 1b of the stator magnetic pole 1 as the rotor magnet repeatedly changes between the N and S poles (i.e. from N to S poles or from S to N poles) during the rotation thereof. As a result, the stator magnetic pole 1 may alternately generate an electric current at each of the first and second ends 1a and 1b thereof. Specifically, the electric current I41' generated at the first end 1a of the stator magnetic pole 1 may flow through the first one-way element 31a', the resisting element 32', the third one-way element 34a' and the lower arm element 212a. Thus, the lower arm element 212a can be turned on. Moreover, the electric current I42' generated at the second end 1b of the stator magnetic pole 1 may flow through the second one-way element 31b', the resisting element 32', the fourth one-way element 34b' and the lower arm element 212b. Thus, the lower arm element 212b can be turned on. From the above, it is therefore recognized that the lower arm elements 212a and 212b can be turned on by the electricity generated by the stator magnetic pole 1.

Figure 4D:
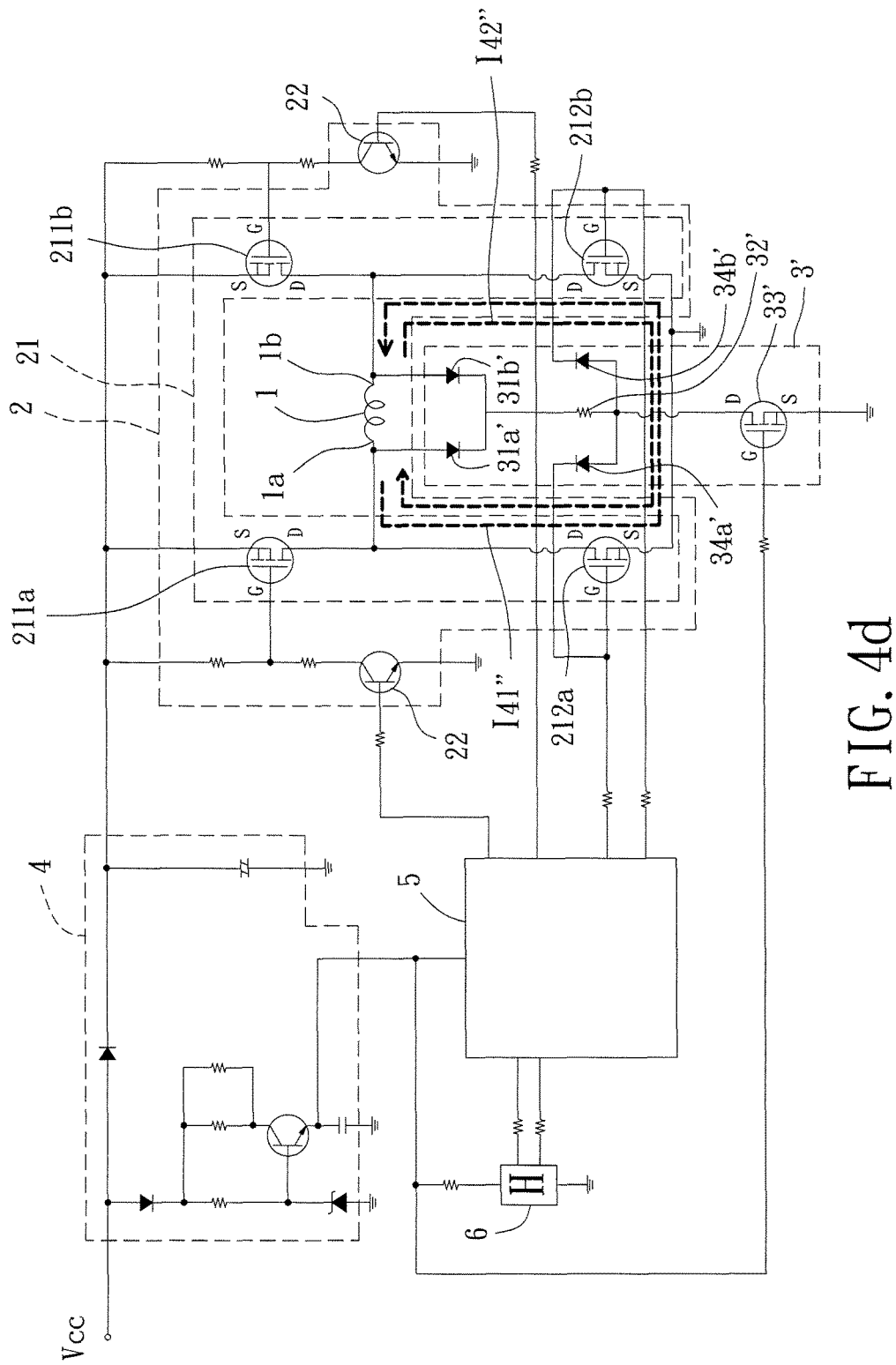
FIG. 4d shows a second operational diagram of the motor system of the second embodiment where the power source of the motor system is no longer available.

Afterwards, as shown in FIG. 4d, the stator magnetic pole 1 may output an electric current I41" which flows from the first end 1a to the second end 1b of the stator magnetic pole 1 for promptly stopping the motor system. Alternatively, the stator magnetic pole 1 may output an electric current I42" which flows from the second end 1b to the first end 1a of the stator magnetic pole 1 for promptly stopping the motor system. In this mechanism, when the power source of the motor system of the second embodiment is shut off, the stop control unit 3' can cooperate with the lower arm elements 212a, 212b to promptly stop the motor system. As compared with the first embodiment, a smaller amount of switches is used in the second embodiment.

Figure 5:
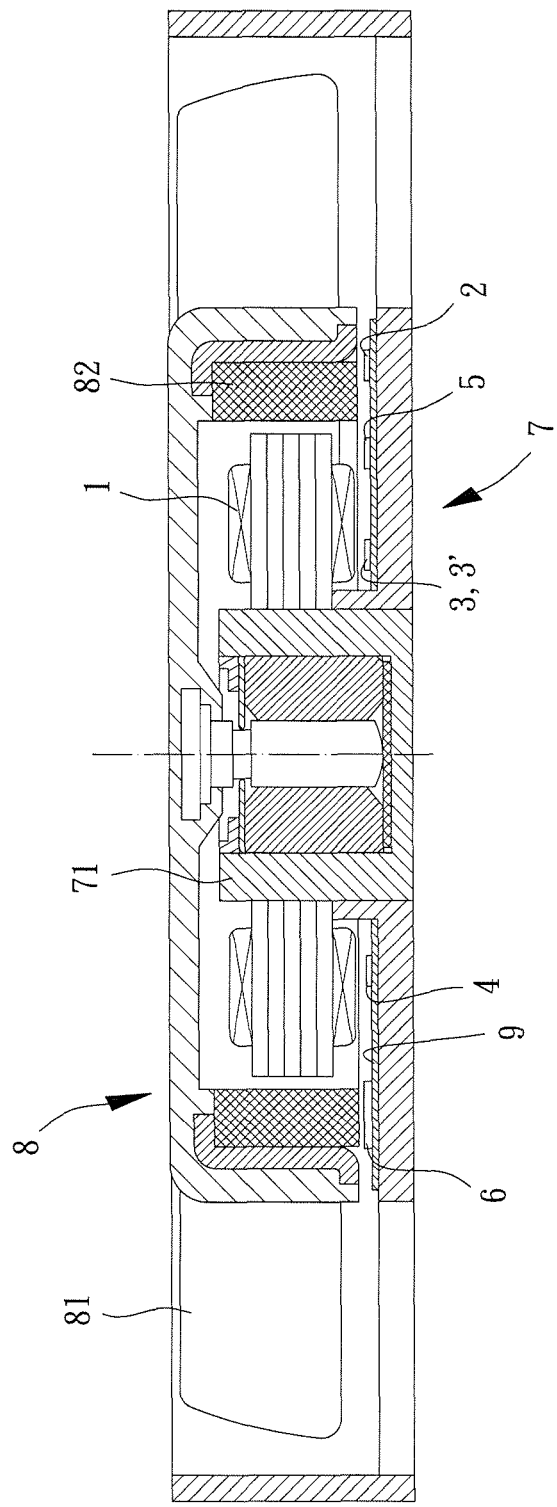
FIG. 5 is a cross sectional view of a fan module using the motor system of the invention.

FIG. 5 is a cross sectional view of a fan module using the motor system of the invention. The fan module may consist of a conventional fan frame, a conventional impeller and the motor system in the first or second embodiment of the invention. In the embodiment, the fan module may include a fan frame 7, an impeller 8, the stator magnetic pole 1, the driving unit 2 and the stop control unit 3, 3'. The fan frame 7 may include a shaft tube 71 with which the stator magnetic pole 1 is coupled. The impeller 8 is rotatably coupled with the shaft tube 71. A blade unit 81 may be coupled with the rotor to form an axial-flow fan or a centrifugal fan. The impeller 8 may include a magnet unit 82 so that the impeller 8 can be magnetically actuated by the magnetic force of the magnetic poles of the stator magnetic pole 1. The driving unit 2 is electrically connected with the stator magnetic pole 1 and controls the stator magnetic pole 1 to change its polarity according to the control signals. The stop control unit 3 is electrically connected to the stator magnetic pole 1. When the power source of the fan module is shut off and the fan module keeps rotating under inertia, the electricity generated by the stator magnetic pole 1 may form a braking force in the closed loop of the stop control unit 3. The braking force will stop the fan module. In addition, the fan module may also include the power supply unit 4, the controller 5 and the magnetic inducing element 6. Based on this, the power supply unit 4 may be electrically connected to the driving unit 2, and the controller 5 may be electrically connected to the driving unit 2 and the power supply unit 4. In addition, the magnetic inducing element 6 may be electrically connected to the controller 5 and the power supply unit 4, and may face the magnet unit 82. Furthermore, the driving unit 2, the stop control unit 3, the power supply unit 4 and the controller 5 may be implemented as an application-specific IC (ASIC). If desired, the magnetic inducing element 6 may also be included in the application-specific IC. The ASIC may be further mounted on a circuit board 9. The circuit board 9 may be installed in the fan frame 7. Specifically, the circuit board 9 may be integrally formed with or detachably attached to the fan frame 7. Alternatively, the circuit board 9 may form a bottom plate of the fan frame 7. Thus, the circuit board 9 may be mounted to the fan frame 7 more conveniently. However, it is not taken as a limited sense.

Figure 6:
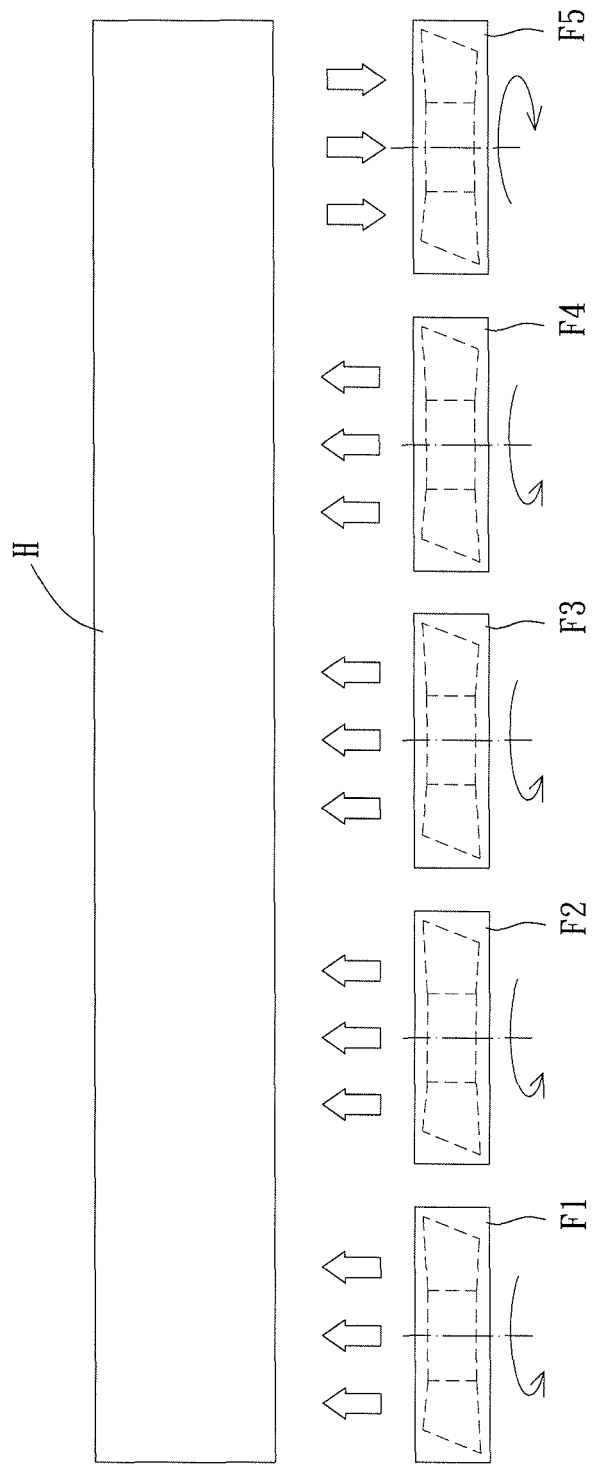
FIG. 6 shows a fan system having a plurality of conventional fans connected in parallel.

In the fan module of the invention, after the power source of the fan module is shut off, the fan module not only can be quickly stopped by the electricity of the stator magnetic pole 1 generated under the inertia effect of the rotation of the rotor, but also can be locked in place after the rotor stops. In addition, the fan module can be used in a fan system having a plurality of fans connected in parallel. Referring to FIG. 6, the fan system may include a plurality of fans F1 to F5 connected in parallel for cooling a heat source "H." The fans F1 to F5 may rotate in the same direction (such as in a counterclockwise direction) during the normal operation. In this regard, when one of the fans (such as F5, for example) fails, the fan F5 can rotate in the opposite direction when the wind blows on it. The faster the fan F5 rotates in the opposite direction, the larger the loss of the intake air volume of the fan system. In order to avoid this, the fans F1 to F5 may be replaced by the fan modules of the invention. Based on this, although one or more fans F1 to F5 fail, the failed fan(s) will be locked in place without rotating. Advantageously, the failed fan will not be driven to rotate in the opposite direction by the wind and therefore will not reduce the intake air volume of the fan system.

Based on the features above, the motor system and the fan module of the first and second embodiments of the invention are characterized as follows. Since the rotor is rotatably coupled with the stator magnetic pole 1 and since the driving unit 2 is electrically connected with the stator magnetic pole 1, the driving unit 2 is able to control the polarity change of the stator magnetic pole 1. Thus, the rotor can be driven to rotate by electricity. In addition, the stop control unit 3, 3' is electrically connected to the stator magnetic pole 1 and the driving unit 2. Based on this, when the power source of the motor system or the fan module is shut off, the stop control unit 3, 3' is able to control the stator magnetic pole 1 to generate electricity during the rotation of the rotor without using any energy-storing component (such as a capacitor). Thus, the electricity of the stator magnetic pole 1 will change the path of the electric current flowing through the stop control unit 3, 3', making the electric current flow from one end (such as the end 1a) to the other end (such as the end 1b) of the stator magnetic pole 1. As such, the magnetic force generated by the stator magnetic pole 1 will brake the rotor, thus quickly stopping the motor system or the fan module. In this arrangement, the motor system or the fan module can be quickly stopped after the power source is shut off. This protects the operator from damage, prevents the operational failure of the motor system or the fan module resulting from the aging of the energy-storing component, prevents the loss of the intake air as the failed fan expels air out of the system when driven by the air to rotate in an opposite direction, and provides an efficient control of the system. Advantageously, the motor system and the fan module can be used in a robotic arm or a fan system requiring a plurality of parallel-connected fans.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor system comprising:
   a stator magnetic pole having first and second ends;
   a rotor rotatably coupled with the stator magnetic pole;
   a driving unit electrically connected with the stator magnetic pole and driving the rotor to rotate by changing a polarity of the stator magnetic pole; and
   a stop control unit electrically connected to the stator magnetic pole and the driving unit,
   wherein if the rotor rotates when the motor system is not electrically powered, the stator magnetic pole generates electricity that changes a path of an electric current flowing through the stop control unit, and the stator magnetic pole outputs an electric current from the first end to the second end or from the second end to the first end thereof, thereby stopping the motor system,
   wherein the stop control unit comprises a first switch, a second switch and a third switch, wherein the first switch and the second switch are electrically connected to the stator magnetic pole and the driving unit, wherein the third switch is electrically connected to the first switch and the second switch, wherein if the motor system is not electrically powered, the third switch is turned off and the electricity generated by the stator magnetic pole turns on the first and second switches, thereby stopping the motor system.

2. The motor system as claimed in claim 1, wherein a one-way element is connected between the third switch and the first end of the stator magnetic pole, and another one-way element is connected between the third switch and the second end of the stator magnetic pole.

3. The motor system as claimed in claim 2, wherein each of the one-way element and the another one-way element is a diode.

4. The motor system as claimed in claim 1, wherein each of the first, second and third switches is an N-channel MOSFET.

5. The motor system as claimed in claim 1, wherein each of the first, second and third switches comprises a first end, a second end and a third end, wherein the first ends of the first and second switches are electrically connected to the second end of the third switch, wherein the second ends of the first and second switches are electrically connected to the stator magnetic pole and the driving unit, wherein the first end of the third switch is electrically connected to a power supply unit, and wherein the third ends of the first, second and third switches are electrically connected to the ground.

6. The motor system as claimed in claim 5, wherein a resisting element and a one-way element are arranged between the third ends of the first and second switches.

7. The motor system as claimed in claim 6, wherein the one-way element is a diode.

8. A motor system comprising:
   a stator magnetic pole having first and second ends;
   a rotor rotatably coupled with the stator magnetic pole;
   a driving unit electrically connected with the stator magnetic pole and driving the rotor to rotate by changing a polarity of the stator magnetic pole; and
   a stop control unit electrically connected to the stator magnetic pole and the driving unit,
   wherein if the rotor rotates when the motor system is not electrically powered, the stator magnetic pole generates electricity that changes a path of an electric current flowing through the stop control unit, and the stator magnetic pole outputs an electric current from the first end to the second end or from the second end to the first end thereof, thereby stopping the motor system,
   wherein the stop control unit comprises a first one-way element, a second one-way element, a resisting element, an electronic switch, a third one-way element and a fourth one-way element, wherein the stator magnetic pole is connected between the first and second one-way elements in series, wherein the resisting element is electrically connected to the first and second one-way elements, wherein the electronic switch is electrically connected to the resisting element, and wherein the third and fourth one-way elements are electrically connected between the resisting element and the driving unit.

9. The motor system as claimed in claim 8, wherein the electronic switch is an N-channel MOSFET.

10. The motor system as claimed in claim 8, wherein each of the first, second, third and fourth one-way elements is a diode.

11. The motor system as claimed in claim 1, wherein the stator magnetic pole includes at least one coil.

12. The motor system as claimed in claim 1, wherein the driving unit comprises a bridge circuit.

13. The motor system as claimed in claim 12, wherein the bridge circuit comprises two upper arm elements and two lower aim elements, wherein each of the two upper arm elements is electrically connected to an auxiliary switch, wherein the two upper arm elements are electrically connected to a power supply unit and the stator magnetic pole, and wherein the two lower arm elements are electrically connected to the stator magnetic pole and a controller.

14. The motor system as claimed in claim 13, wherein the controller is electrically connected to the auxiliary switches.

15. The motor system as claimed in claim 13, wherein the controller is electrically connected to a magnetic inducing element.

16. The motor system as claimed in claim 1,
wherein the rotor is coupled with a blade unit, and
wherein the driving unit drives the blade unit to rotate by changing the polarity of the stator magnetic pole.

17. The motor system as claimed in claim 16, wherein a one-way element is connected between the third switch and the first end of the stator magnetic pole, and another one-way element is connected between the third switch and the second end of the stator magnetic pole.

18. The motor system as claimed in claim 17, wherein each of the one-way element and the another one-way element is a diode.

19. The motor system as claimed in claim 16, wherein each of the first, second and third switches is an N-channel MOSFET.

20. The motor system as claimed in claim 16, wherein each of the first, second and third switches comprises a first end, a second end and a third end, wherein the first ends of the first and second switches are electrically connected to the second end of the third switch, wherein the second ends of the first and second switches are electrically connected to the stator magnetic pole and the driving unit, wherein the first end of the third switch is electrically connected to a power supply unit, and wherein the third ends of the first, second and third switches are electrically connected to the ground.

21. The motor system as claimed in claim 20, wherein a resisting element and a one-way element are arranged between the third ends of the first and second switches.

22. The motor system as claimed in claim 21, wherein the one-way element is a diode.

23. The motor system as claimed in claim 16, wherein the stop control unit comprises a first one-way element, a second one-way element, a resisting element, an electronic switch, a third one-way element and a fourth one-way element, wherein the stator magnetic pole is connected between the first and second one-way elements in series, wherein the resisting element is electrically connected to the first and second one-way elements, wherein the electronic switch is electrically connected to the resisting element, and wherein the third and fourth one-way elements are electrically connected between the resisting element and the driving unit.

24. The motor system as claimed in claim 23, wherein the electronic switch is an N-channel MOSFET.

25. The motor system as claimed in claim 23, wherein each of the first, second, third and fourth one-way elements is a diode.

26. The motor system as claimed in claim 16, wherein the stator magnetic pole includes at least one coil.

27. The motor system as claimed in claim 16, wherein the driving unit comprises a bridge circuit.

28. The motor system as claimed in claim 27, wherein the bridge circuit comprises two upper arm elements and two lower arm elements, wherein each of the two upper arm elements is electrically connected to an auxiliary switch, wherein the two upper arm elements are electrically connected to a power supply unit and the stator magnetic pole, and wherein the two lower arm elements are electrically connected to the stator magnetic pole and a controller.

29. The motor system as claimed in claim 28, wherein the controller is electrically connected to the auxiliary switches.

30. The motor system as claimed in claim 28, wherein the controller is electrically connected to a magnetic inducing element.

31. The motor system as claimed in claim 16, wherein the stator magnetic pole is mounted to a fan frame.

32. The motor system as claimed in claim 16, wherein the driving unit and the stop control unit are integrated on a circuit board.

33. The motor system as claimed in claim 32, wherein the circuit board is mounted to a fan frame.

34. The motor system as claimed in claim 33, wherein the circuit board is integrally formed with the fan frame.

35. The motor system as claimed in claim 33, wherein the circuit board is detachably mounted to the fan frame.

36. The motor system as claimed in claim 33, wherein the circuit board forms a bottom plate of the fan frame.

\* \* \* \* \*